(12) United States Patent
Hagan

(10) Patent No.: US 9,871,846 B2
(45) Date of Patent: Jan. 16, 2018

(54) DOWNLOAD BOOTHS

(71) Applicant: Chris Hagan, Halifax (GB)

(72) Inventor: Chris Hagan, Halifax (GB)

( * ) Notice: Subject to any disclaimer, the term of this patent is extended or adjusted under 35 U.S.C. 154(b) by 150 days.

(21) Appl. No.: 14/739,317

(22) Filed: Jun. 15, 2015

(65) Prior Publication Data
US 2015/0365464 A1  Dec. 17, 2015

(30) Foreign Application Priority Data

Jun. 13, 2014 (GB) .................................. 1410622.3
Mar. 23, 2015 (GB) .................................. 1504834.1

(51) Int. Cl.

| | |
|---|---|
| *G06F 15/16* | (2006.01) |
| *H04L 29/08* | (2006.01) |
| *H04W 12/06* | (2009.01) |
| *G06F 3/0484* | (2013.01) |
| *H04B 5/00* | (2006.01) |
| *H04L 12/927* | (2013.01) |
| *H04L 29/06* | (2006.01) |
| *H04W 84/12* | (2009.01) |

(52) U.S. Cl.
CPC .......... *H04L 67/06* (2013.01); *G06F 3/04842* (2013.01); *H04B 5/0031* (2013.01); *H04L 47/808* (2013.01); *H04L 67/10* (2013.01); *H04L 67/42* (2013.01); *H04W 12/06* (2013.01); *H04W 84/12* (2013.01)

(58) Field of Classification Search
CPC .......... G06Q 30/0601; G06Q 30/0641; G06Q 20/327; H04L 2209/80; H04W 84/12; H04W 12/06
See application file for complete search history.

(56) References Cited

U.S. PATENT DOCUMENTS

| | | | | |
|---|---|---|---|---|
| 9,204,251 | B1 * | 12/2015 | Mendelson | ............... G08G 1/14 |
| 2003/0229549 | A1 * | 12/2003 | Wolinsky | ........... G06Q 30/0248 |
| | | | | 705/14.61 |
| 2010/0023579 | A1 * | 1/2010 | Chapweske | ........ H04N 7/17336 |
| | | | | 709/203 |

(Continued)

*Primary Examiner* — Tauqir Hussain
*Assistant Examiner* — Kamran Mohammadi
(74) *Attorney, Agent, or Firm* — Daniel A. Tanner, III

(57) ABSTRACT

A download booth comprising a local file server operatively connected to a removable disk drive containing, in use, multimedia content, the local file server further comprising a network interface operatively connected to a plurality of wireless access points and a wireless connection manager, wherein the wireless connection manager is configured to authenticate incoming connection requests from a plurality of wireless devices and upon authentication, to temporarily connect each authenticated wireless device to its own access point for the duration of a connection session. The end of the connection session may be determined by an estimated download time for a particular multimedia file, or upon detection of completion of a download from the download booth to the wireless device. Suitably, the connection manager is configured to dynamically queue connection requests when the number of concurrent connection requests exceeds the number of available access points and to prioritize the connection requests according to an estimated aggregated end time for completing the download requests.

17 Claims, 5 Drawing Sheets

(56) References Cited

U.S. PATENT DOCUMENTS

| | | | |
|---|---|---|---|
| 2011/0182250 A1* | 7/2011 | Shin | H04W 4/00 |
| | | | 370/329 |
| 2013/0044599 A1* | 2/2013 | Cherian | H04L 47/2433 |
| | | | 370/235 |
| 2014/0068719 A1* | 3/2014 | Kiukkonen | H04W 12/08 |
| | | | 726/4 |
| 2014/0280683 A1* | 9/2014 | Yanagihara | H04L 67/2842 |
| | | | 709/213 |

* cited by examiner

DOWNLOAD BOOTHS

CROSS-REFERENCE TO RELATED APPLICATIONS

This application claims priority under 37 C.F.R. §119(a)-(d) to United Kingdom Patent Application No. 14 10622.3, filed Jun. 13, 2014, and United Kingdom Patent Application No. 15 04834.1, filed Mar. 23, 2015, the disclosures of which are hereby incorporated by reference herein in their entirety.

BACKGROUND OF THE INVENTION

This invention relates to download booths and to wireless downloading of data in public areas.

With the proliferation of wireless and internet-connected devices, such as mobile telephones, laptop computers, tablet PCs and the like, the need to be able to access network services, such as the internet and file servers, whilst on the move is increasing. Modern portable devices comprise various types of wireless connectivity adapters, such as GPRS, 3G, 4G, Bluetooth and Wi-Fi adapters, which enable the device to connect to various public and private networks wirelessly.

A known problem with connecting to wireless pubic mobile telephony or data networks, (such as 3G and 4G networks) is that of cost because data downloads (and uploads) are usually charged to the user in proportion to the amount of data uploaded or downloaded. Thus, it is nowadays increasingly common for users to configure their potable electronic devices such that the various network adapters are used in order of cost and speed. For example, a mobile telephone equipped with 4G, Wi-Fi and Bluetooth network adapters may be configured to attempt to connect via Wi-Fi in preference to 4G, to avoid the high data costs associated with the 4G network. This is especially the case where large data downloads are required, for example, when downloading a 4+Gb feature-length movie file.

Wi-Fi, however, is not ubiquitous, and when out of the home or office, users must often locate a public Wi-Fi "hot spot" to be able to connect to the internet or to a file server. Public Wi-Fi hot spots, however, are often quite densely populated, that is to say, having multiple concurrent users connected to one, or just a few, wireless access points (APs), which can adversely affect download speeds where the available AP bandwidth has to be shared between many users at once. In particular, where users wish to download large data files, the download times, and Wi-Fi drop-out frequency may be unacceptably high in congested areas, and so a need exists for a solution to one or more of the above problems.

BRIEF SUMMARY OF THE INVENTION

According to an aspect of the invention, there is provided a download booth comprising a local file server operatively connected to a removable disk drive containing, in use, multimedia content, the local file server further comprising a network interface operatively connected to a plurality of wireless access points and a wireless connection manager, wherein the wireless connection manager is configured to authenticate incoming connection requests from a plurality of wireless devices and upon authentication, to temporarily connect each authenticated wireless device to its own access point for the duration of a connection session.

By temporarily allocating and connecting each wireless device to its own dedicated access point for the duration of a session, each wireless device is able to make full use of the available bandwidth of the respective access point for the duration of its session. This solution avoids connection concurrency, that is to say, having multiple wireless devices simultaneously connected to a single access point, whereby the available bandwidth of the access point has to be shared between the concurrent users. This greatly increases the download speed for individual users of the download booth compared with known download systems in which the available bandwidth is shared between multiple concurrent users.

The download booth comprises a local file server, which is operatively connected to a removable disk drive. Such a configuration facilitates the updating of multimedia content on the file server simply by replacing the removable disk drive from time to time. Suitably, the removable disk drive comprises a "hot swap" disk caddy.

Additionally or alternatively, the file server may be connected, for example, via the internet, to a remote file server. This configuration may enable the file server to download additional content from a remote source (e.g. an FTP server), which additional content may be stored on the removable hard drive, or on a (logically or physically) separate hard disk of the file server.

The file server suitably comprises a file system for organising and searching the multimedia content. Suitably, the file server comprises a web-based portal via which users can browse and/or search the file system for content that they may wish to download. Suitably, the web-based portal is accessible via an open (non-password-protected) wireless connection to the download booth. Such a configuration enables prospective users of the system to browse the available multimedia content prior to authenticating a connection.

The local file server comprises a network interface operatively connected to a plurality of wireless access points. The number of access points is suitable selected to correspond to an anticipated number of concurrent users of the system. Thus, a download booth located in a densely populated, high-use location (e.g. an airport departure lounge) may have 100 or so access points to enable up to 100 users to be concurrently connected to it.

The wireless connection manager is configured to authenticate incoming connection requests from wireless devices. This is suitably effected by way of an application executed in the wireless devices. The application, where not already present on a given wireless device is suitably available for download from the download booth via an open (i.e. non-password-protected) portal. Additionally or alternatively, the connection manager may be configured to authenticate connection requests via a web browser form accessible to user of the wireless devices, whereby users can input authentication details (e.g. username and password, chip & PIN, credit card details, etc.) to gain access to the multimedia content on the file server.

The connection manager is configured to temporarily connect each authenticated wireless device to its own access point for the duration of a connection session. The duration of an access session may be set with reference to an estimated download time for a particular multimedia file, or it may be comprise a dynamic timeout parameter triggered by a particular event, for example, the completion of a download from the download booth to the wireless device. Thus, the download booth acts efficiently inasmuch as connection sessions are terminated promptly after a download has been completed, thereby freeing-up the system for subsequent users.

The connection manager is suitably configured to populate and maintain a connection table containing a data relating to concurrent and/or historic connection sessions.

Where the number of concurrent connection requests exceeds the number of available access points, for example, 110 users simultaneously attempting to 100 access points, the connection manager is suitably configured to queue access requests in a dynamic fashion. A dynamic queue may be configured on the fly in response to connection requests and data held in the connection table. For example, at a given point in time, all of the available access points are in use (i.e. connected to and serving data to their respective individual wireless devices) and further connection requests are received. The further connection requests cannot be processed until one or more of the access points becomes available. The connection manager thus populates the connection table with the further connection requests: the connection requests containing data relating to the size of a file to be downloaded from the download booth. The connection manager then prioritises the connection requests according to estimated aggregated end times for completing the download requests. This principle is explained schematically with reference to FIG. 9 of the drawings below.

The application executed in the wireless device suitably comprises an authentication interface whereby a user of the wireless device is able to authorise a download. Such authorisation may comprise entering authentication credentials for a subscription service whereby the user can be billed separately for each completed download; or it may be by way of entering payment credentials, such as credit card data for billing purposes.

According to an aspect of the invention, there is provided a download booth comprising a local file server hosting multimedia content, at least one wireless access point operatively connected to the local file server to which wireless devices, in use, are operatively connectable to access the multimedia content on the local file server; the download booth being characterised by: at least one display screen adapted, in use, to display a menu of the multimedia content hosted on the local server, wherein the or each display screen comprises a plurality of NFC tags, each NFC tag being loaded with data associated with specific multimedia content hosted on the local file server, whereby, in use, when a wireless device is placed with range of one of the NFC tags, data is exchanged between the NFC tag and the wireless device to automatically initiate a download, via the wireless access point, from the local file server to the wireless device, of the said specific multimedia content, and wherein the download booth is adapted to display a graphical user interface on the display screen or screens, the graphical user interface comprising a plurality of display areas containing information about different specific multimedia content hosted on the local server, and wherein each display area is associated with a different NFC tag loaded with data corresponding to the respective specific multimedia content.

A second aspect of the invention provides a display comprising a display screen having a first side and a second side, a first projector arranged to project a first image onto the first side of the display screen, and a second projector arranged to project a second image onto the second side of the display screen.

Suitably the display screen is manufactured from a transparent material, such as glass or acrylic. Suitably the display screen is manufactured from a translucent material, such as glass or acrylic. Suitably the display screen is manufactured from an opaque material.

The display screen suitably comprises one or more NFC tags embedded within it, for example sandwiched between two layers of the display screen forming the first and second sides.

Advantageously, by projecting images onto both sides of the display screen, users can walk around the screen and can watch different projected images or movies, which may be the same, or different, on opposite sides of the screen. Where the display screen is manufactured from a transparent material, users may be able to see through the screen, giving rise to a pleasing visual effect.

Suitably, one or both of the projectors comprises a laser projector.

The display screen of the second aspect of the invention is suitably used in the downloading booth of the first aspect of the invention.

The download booth thus provides a convenient means for users to wirelessly download large multimedia data files, such as feature-length movies, from a file server to a wirelessly-connected device, such as a mobile telephone, laptop computer or tablet PC. The download booth avoids the need for users of wireless devices to connect to telephony networks. Further, because the download booth is especially configured for downloading content from the local file server to wireless devices, the bandwidth of the AP is not shared with other users for other purposes, such as general internet surfing, etc.

Suitably, the download booth comprises a plurality of wireless access points, which may increase the available bandwidth per user, thus improving the individual and collective download speeds of the users of the booth.

Suitably, the provision of NFC tags adjacent respective areas of the display screen(s), which NFC tags are configured to automatically initiate the download of specific multimedia content to the wireless device, makes browsing and selecting multimedia content to download extremely simple and intuitive. In short, a user simply needs to identify particular content to download on one of the display screens, and to tap his/her wireless device against the screen in the region of the display area, and a download of that particular content is initiated automatically.

Suitably, the or each display screen comprises a projector-type display screen. Such a configuration has several advantages. First, it enables much larger screens to be used economically. Second, the active part of the screen, i.e. the projector element, is not subject to repeated tapping by users, and thus the system is more durable. Third, because the invention relies upon NFC tags being placed against their respective display areas, this is readily accomplished using a disposable, or replicable screen element: NFC tags placed on the back of a relatively thin projector screen are closer to the wireless device at the point of tapping, and when it is desired to change the layout of the display areas, it is not necessary to detach and re-position the NFC tags because the screen can be discarded and replaced with a fresh screen, with fresh NFC tags appropriately located.

The download booth comprises a local file server which hosts multimedia content locally. The local file server could be operatively connected to a remote file server, for example, via the internet. Suitably, a synchronisation application operates between the local file server and the remote file server to facilitate updating content on the local file server. This has the advantage that multimedia content can be served to users locally, i.e. from the local server to the wireless device, rather than directly from a remote file server hosted online. This increases the download speed because the speed of the "internet" connection (the connection speed over a WAN from the local server to a remote server) is largely irrelevant.

At least one wireless access point is provided, and this is suitably a Wi-Fi access point for the sake of interoperability between different types of device. More than one wireless access point may be provided, which may enable the serving of multimedia content to the wireless devices to be speeded up (e.g. by duplicating, or multiplexing bandwidth).

Suitably, an application can be executed on the wireless device to facilitate the operation of the download booth. Suitably, the application comprises a username and password sign-in system that grants or denies (for example, depending on a user's subscription basis) access to different types of multimedia content. The interaction of the application with the download booth may be local, i.e. executed in a server application of the local file server, or authentication may be executed remotely.

The download booth suitably comprises a directional signal strength indicator, such as that described in published PCT application No. WO2014076496. Such a directional signal strength gauge is configured to repeatedly broadcast a relatively small data packet from the local file server to the wireless device and to time the download to obtain an estimate of the actual, instantaneous download speed. By repeating this procedure as the wireless device moves around (determined, for example by on-board positioning systems e.g. gyroscopes, accelerometers, GPS, etc.) and mapping download speed as a function of position, the directional signal strength gauge is able to indicate to the user a direction, and optionally, a distance, in which to travel to obtain the fastest possible download speed. In many cases, this may mean moving closer to the access point, or it could mean moving towards a reflector or away from an attenuating element.

Each NFC tag is loaded with data associated with specific multimedia content hosted on the local file server. The NFC tags may be loaded with text information, or just an ID, which is correlated with particular content on the local file server, for example, using a back-end database.

The download booth is adapted to display a graphical user interface on the display screen or screens, the graphical user interface comprising a plurality of display areas containing information about different specific multimedia content hosted on the local server. Each display area may comprise a static picture (e.g. a poster shot for a movie), a video clip (e.g. a movie trailer), text information (e.g. a synopsis, cast list, etc.) or any combination of the above. The display area suitably comprises a blacked-out region, behind which, the corresponding NFC tag is located. The purpose of the blacked-out area is to conceal the NFC tag from view, which may otherwise be visible, especially where the display screen comprises a back-projection display screen.

The download booth suitably has a relatively open layout, such as like a gazebo, enabling users to walk into it to inspect the or each display screen with relative ease. The wireless access point or points are suitably located in a ceiling of the download booth, which means that they are substantially co-located with the display screen or screens, and they are elevated to afford a greater effective range.

BRIEF DESCRIPTION OF THE DRAWINGS

An embodiment of the invention shall now be described, by way of example only, with reference to the accompanying drawings in which.

DETAILED DESCRIPTION

Figure 1:
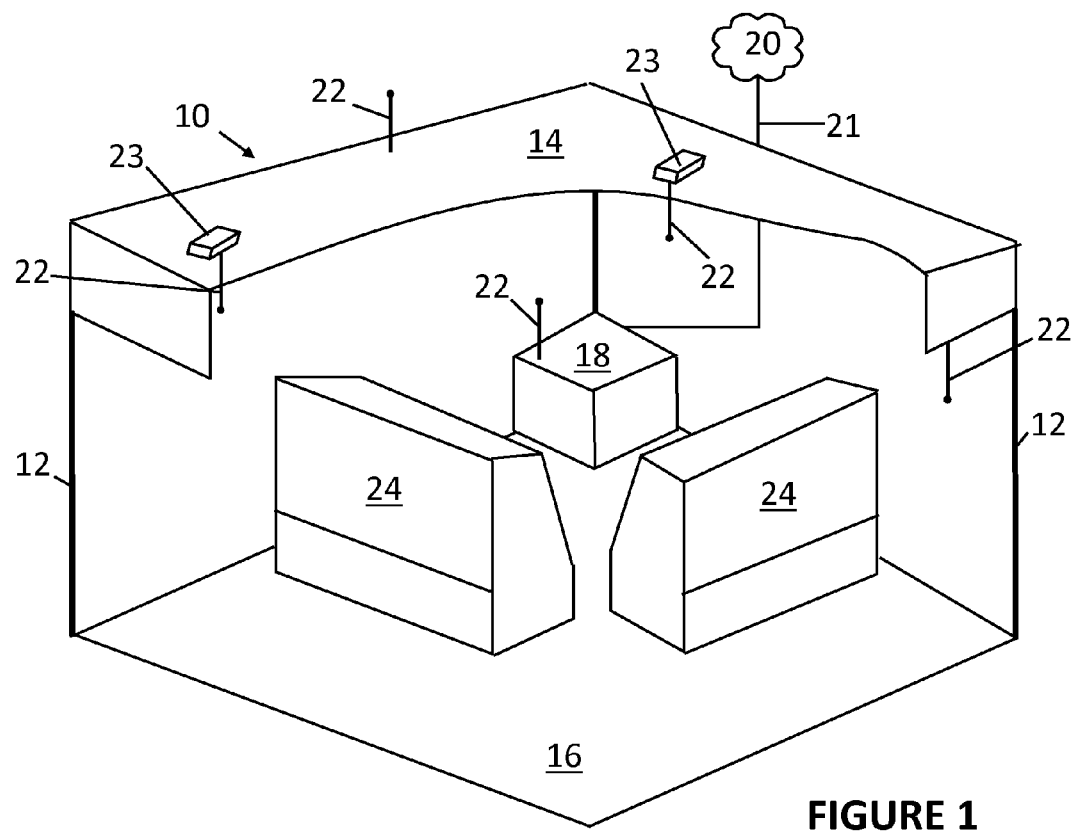
FIG. 1 is a partially cut-away, perspective view of a download booth in accordance with the invention.

In FIG. 1, a download booth 10 comprises a supporting framework 12 surrounding a ceiling 14 above a floor area 16. The download booth 10 can be installed in any location, although it is envisaged that it may be installed in cinema foyers, airports, shopping malls and the like, where there are many users that may wish to use the system. Users (not shown) are able to walk into the download booth 10 to browse and download content, if desired.

The download booth 10 comprises a local file server 18 comprising a data storage device, such as a hard disk, RAID array or the like, upon which multimedia content is stored. The server 18 is connected to a WAN 20, such as the internet, either via cabling 21 or wirelessly, and a synchronisation application of the server 18 keeps the multimedia content stored on the server 18 up-to-date. Fresh content can be downloaded from the WAN 20 either on an ad-hoc basis (e.g. when a user request content that is not stored locally), periodically (e.g. when the content of multiple download booths 10 is to be updated simultaneously), or continuously (e.g. where the available content on the local server 18 needs to be changed regularly). The synchronisation is typically configured by a remote server on the WAN 20, for example, by a movie distribution company so that the latest content can be offered for download.

An advantage of the download booth 10 is that it enables users to download large multimedia files in a convenient and intuitive manner, and because a relatively high speed Wi-Fi connection is made available via multiple access points 23, from a local file server 18, the downloading of large data files, such as HD movie files, is greatly speeded-up compared with downloading the same content over a telephony connection from the internet, say. Further, by locating the download booth 10 in areas such as cinema foyers, airport lounges, etc. users may be looking to download movies and the like, e.g. after having watched a good film at the cinema, or for entertainment on a flight. These are locations where users would typically need to use wireless telephony data network connections (which could be expensive and slow to use), and so the invention ameliorates many of the problems associated with on-the-move downloading.

The download booth 10 comprises a ceiling 14, which has a number of Wi-Fi antennae 22 mounted in it. Each antenna 22 is operatively connected to a Wi-Fi access point 23 and it will be appreciated that several access points 23 may be provided to increase the available bandwidth for downloading.

Located within the download booth 10 are a number of large display screens 24, each of which is configured to display information about multimedia content on the local file server 18.

Figure 2:
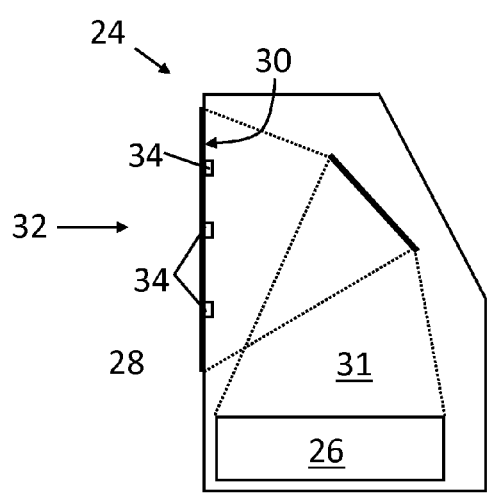
FIG. 2 is a schematic cross-section of a first type of screen for a download booth in accordance with the invention.

Referring now to FIG. 2, in a first embodiment of the invention, the display screens 24 comprise a back-projection display screen comprising a projector 26 and a screen 28 onto which an image is projected by the projector 26. The screen 28 is manufactured from a thin, translucent plastics sheet such that an image projected 31 onto its rear surface 30 is visible from the front 32. The screen 28 is removable from a housing 34 of the display screen 24, and so it can be renewed as and when necessary.

Stuck to the rear surface 30 of the screen 28 are a number of NFC tags 34, whose locations correspond to different display areas of the projected image on the screen 28, as visible from the front 32.

Figure 3:
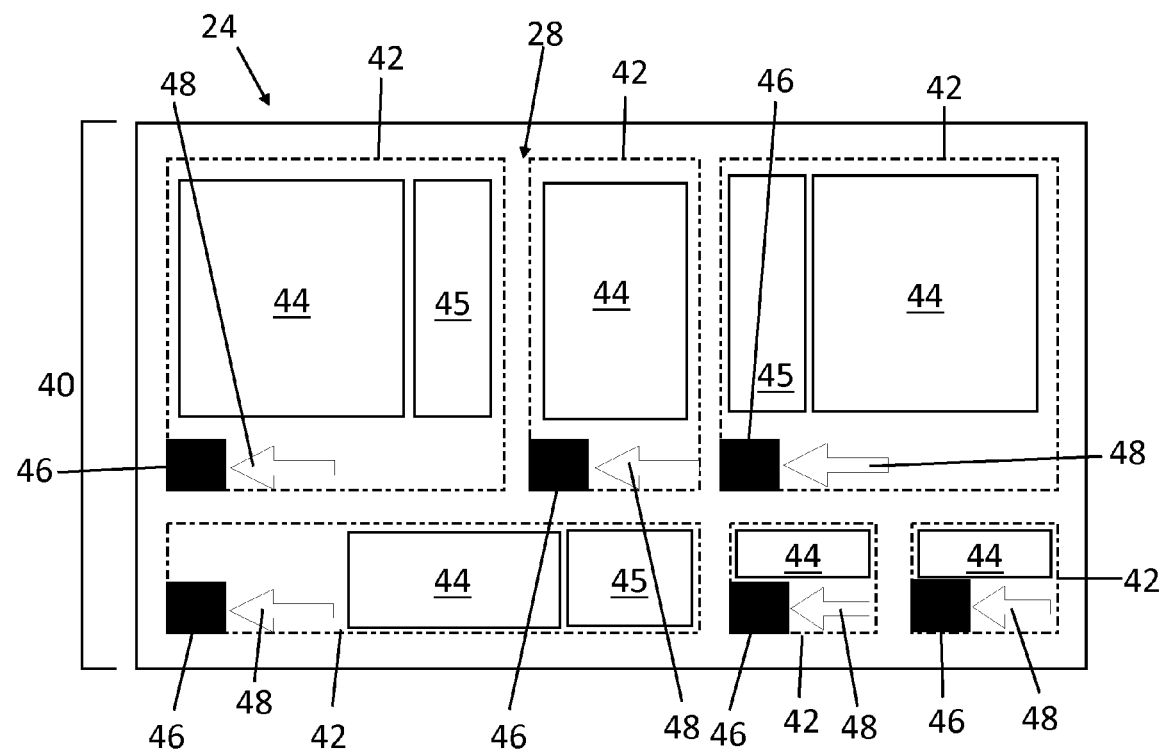
FIG. 3 is a schematic view of a graphical user interface, displayable on a screen of a download booth in accordance with the invention.

In FIG. 3, it can be seen how the display screen 24 has a graphical user interface 40 projected onto it, which comprises a number of discrete display areas 42. The display areas 42 can be of different sizes, to emphasise certain content, although this is not necessary. Each display area 42 comprises an image area 44, which can contain a still image, for example, a poster shot of a movie, or a moving image, for example, a movie trailer projected onto the screen 28. A user visiting the download booth 10 is thus able to readily determine the multimedia content that is on offer, and can watch a preview: the image or movie clip 44 corresponding to specific multimedia content stored on the local file server 18. Text or other information 45 may also be displayed alongside the picture or movie 44.

Wishing to download a particular multimedia file, a user brings his or her NFC-enabled wireless device into proximity of an NFC tag 34 mounted on the rear of the screen 28, which causes a data exchange between the wireless device and the NFC tag 34, thereby initiating a download to the wireless device. Conveniently, the location of the NFC tags 34 correspond to blacked-out areas 46 of the display areas 42, which are indicated by an arrow or pointer, or some other indicia 48, such as "tap here to download" forming part of the display area 42.

The user's wireless device is suitably pre-loaded with an application that interfaces with the NFC reader of the device. The application is configured to read the NFC tag and to determine its ID, which corresponds to a particular multimedia file on the local file server 18. Upon detection of the NFC tag 34, the application of the wireless device connects the wireless device's Wi-Fi to an access point of the download booth 10, such that a Wi-Fi download of the selected multimedia file can be initiated automatically from the local server 18 to the wireless device automatically.

The application pre-loaded on the wireless device suitably comprises configuration settings corresponding to the user's preferences. For example, an English-speaking user may have "English" configured in the application as the preferred language, and so the application can be configured to preferentially download an English-language version of the multimedia content from the local file server 18. The user may have a number of preference settings, for example, a number of languages ranked by preference, a native screen resolution of the wireless device, subtitling preferences, etc. and the application can be configured to download appropriate multimedia content from the local server 18 in accordance with those preferences.

The application also comprises a subscription portal, whereby users can configure billing options on a subscription, or pay-per-download basis, as will be readily apparent to those skilled in the art.

The advantages of using an application on the wireless device are manifold: it simplifies the selection of multimedia content according to user preferences (e.g. language, subtitling, etc.) as well as enabling the user to benefit from reduced download fees for different resolutions of downloaded multimedia content. Specifically, there would be no point in a user paying a premium for downloading an HD (1920×1080 pixel) resolution a multimedia file for viewing on a 320×480 pixel screen resolution device, and so the system can be configured to automatically select the best picture, or the best value, depending on user preferences. Also, by serving multimedia content of desired, rather than default, resolutions to different users, the bandwidth utilisation of the download booth 10 can be optimised.

Figure 4:
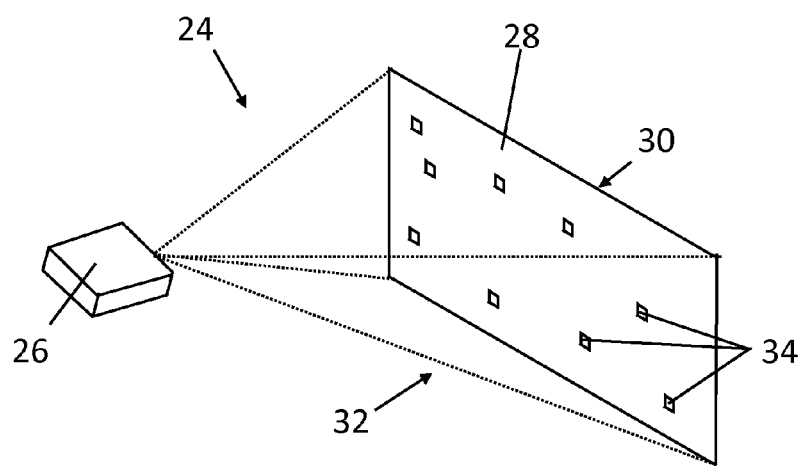
FIG. 4 is a schematic perspective view of a second type of screen for a download booth in accordance with the invention.

Referring now to FIG. 4, an alternative screen 24 for the download booth 10 is shown, this time being a front-projection screen 28 with the projector 26 being located on the front 32 side of the screen 28. The NFC tags 34 are nevertheless located on the rear 30 of the screen's surface, so that they are not directly visible to users in the booth 10. It will also be appreciated that LCD or LED screens could be used; with NFC tags 34 adhered to a rear casing of the screen. However, it will be appreciated that in such a situation, the thickness of the screen 24, i.e. the distance between the rear casing where the NFC tags are located and the front surface of the LCD/LED panel may be approaching, or exceeding NFC range, and so such a configuration, whilst being possible, is not preferred. Moreover, where an LED/LED display screen is used, there is an increased likelihood of the screen being damaged by users touching it, or tapping their NFC-enabled devices against the display panel surface.

Figure 5:
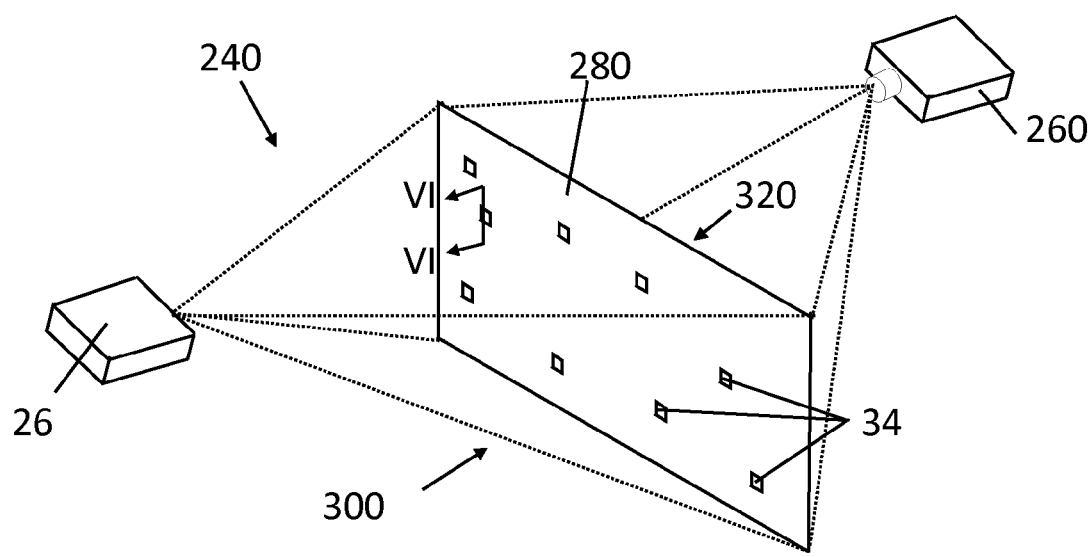
FIG. 5 is a schematic perspective view of a third type of double-sided display screen for a download booth in accordance with the invention.
Figure 6:
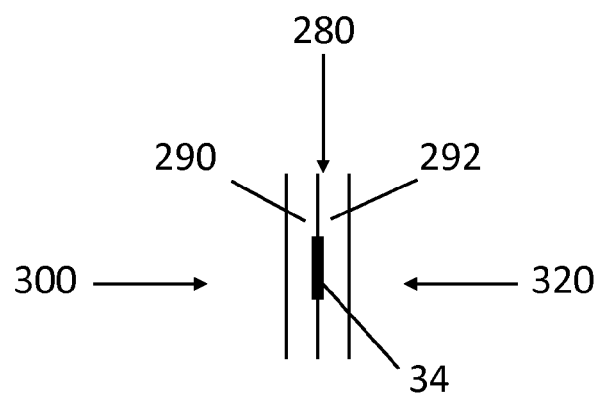
FIG. 6 is a cross-section of FIG. 5 on VI-VI.

In FIG. 5, a double-sided display 240 comprises a large display screen 280, several meters wide, having a first side 300 and a second side 320. A first projector 26 is aimed so as to project a first image onto the first side 300 of the display screen 280; and a second projector 260 is aimed so as to project a second image onto the second side 320 of the display screen 280. As can be seen in FIG. 6, the display screen 280 is manufactured from two sheets of translucent acrylic 290, 292 with NFC tags embedded within the display screen 280, that is to say, sandwiched between the first 290 and second 292 sheets of acrylic.

As previously described, each of the projectors 26, 260 is arranged to project a graphical user interface 28 onto its respective side 300, 320 of the display screen 280 (as explained in relation to FIG. 3 above), and the NFC tags 34 can be activated by bringing NFC-enabled devices into proximity with them from either side of the display 240. Such a configuration may be advantageous in relatively open public spaces, where users may wish to wander around the screen 240.

Figure 7:
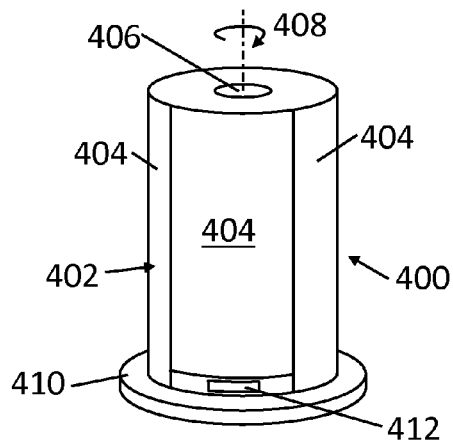
FIG. 7 is a schematic view of a download booth in accordance with the invention.
Figure 8:
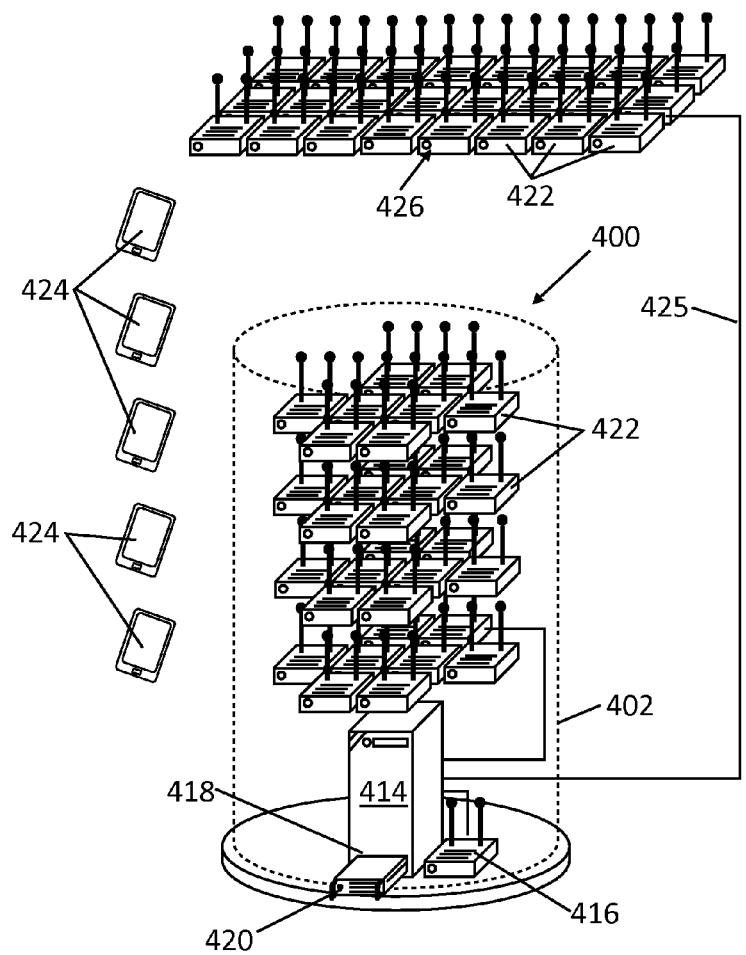
FIG. 8 is a schematic internal view of the download booth of FIG. 7.

Referring now to FIGS. 7 and 8 of the drawings, an embodiment of a download booth 400 comprises an external housing 402, in this case, a cylindrical housing approximately 1.5 m tall, which is located in a public space, such as a cinema foyer or an airport waiting area. The external housing 402 comprises a set of curved LED display screens 404 upon which trailers and other advertisements can be displayed to attract the attention of prospective customers. Typically, the display screens 404 are configured to display movie clips, images, etc. relating to content that is available from the booth 400 for immediate downloading. The booth 400 additionally comprises a speaker 406 through which advertising and attention-grabbing messages, music, etc. can be played out to prospective customers. In certain embodiments, the housing 402, and hence the display screens 404, is mounted for rotation 408 on a base 410, although a similar effect could be achieved by scrolling the images from one screen 404 to another. The housing 402 additionally comprises a drive slot 412 for receiving a removable disk drive, as shall be described below. The drive slot 412 enables removable disk drives to be hot-swapped without necessarily having to turn off the booth 400.

In FIG. 8, the internal workings of the download booth 400 can be seen. The download booth 400 comprises a local file server computer 414, which is connected to the internet (not shown) via a router 416. The server 414 is thus able to connect to a remote server (not shown) for reporting and downloading purposes. The sever 414 comprises a local hard disk drive (not visible), which stores its operating system, other applications and certain content that is available for download. The server 414 additionally comprises a hot swap drive caddy 418, which receives a removable hard disk drive 420, which can be inserted into, and removed from, the booth 400 via the drive slot 412 previously described.

The server 414 comprises a high-speed network interface (not visible), which connects to a large number of high-speed wireless access points 422. In the illustrated embodiment, there are thirty-two internal MIMO access points 422 providing sixty-four independent wireless connections, thus permitting up to sixty-four concurrent high-speed wireless connections to up to sixty-four wireless devices 424. The MIMO access points 422 are typically 802.11 ac standard Wi-Fi access points, each providing up to 3.2 Gbps connection speeds. In principle, therefore, the download booth can serve 4 Gb movie downloads to each of the connected wireless devices 424 in approximately thirteen seconds. The invention thus permits mass data transfer in high speed, which means that users of the system do not need to wait unacceptably long periods to complete a download (cf. approximately thirteen minutes if each of the sixty-four downloads were served sequentially, or about the same time if conventional Wi-Fi networks (300 Mbps) are used).

In FIG. 8, it can be seen that the download booth 400 is additionally connected 425 to an external bank 426 of high-speed MIMO access points 422, which can be located, for example, in the ceiling above the download booth 400. This arrangement permits an even higher number of concurrent users, and wireless devices 424, to connect to the booth 400.

Each wireless device 424 can be pre-loaded loaded with an app that facilitates downloading data from the wireless download booth 400 onto it, or the app can be downloaded via an open-access wireless connection from one of the access points 422, of the server's router 416.

Figure 9:
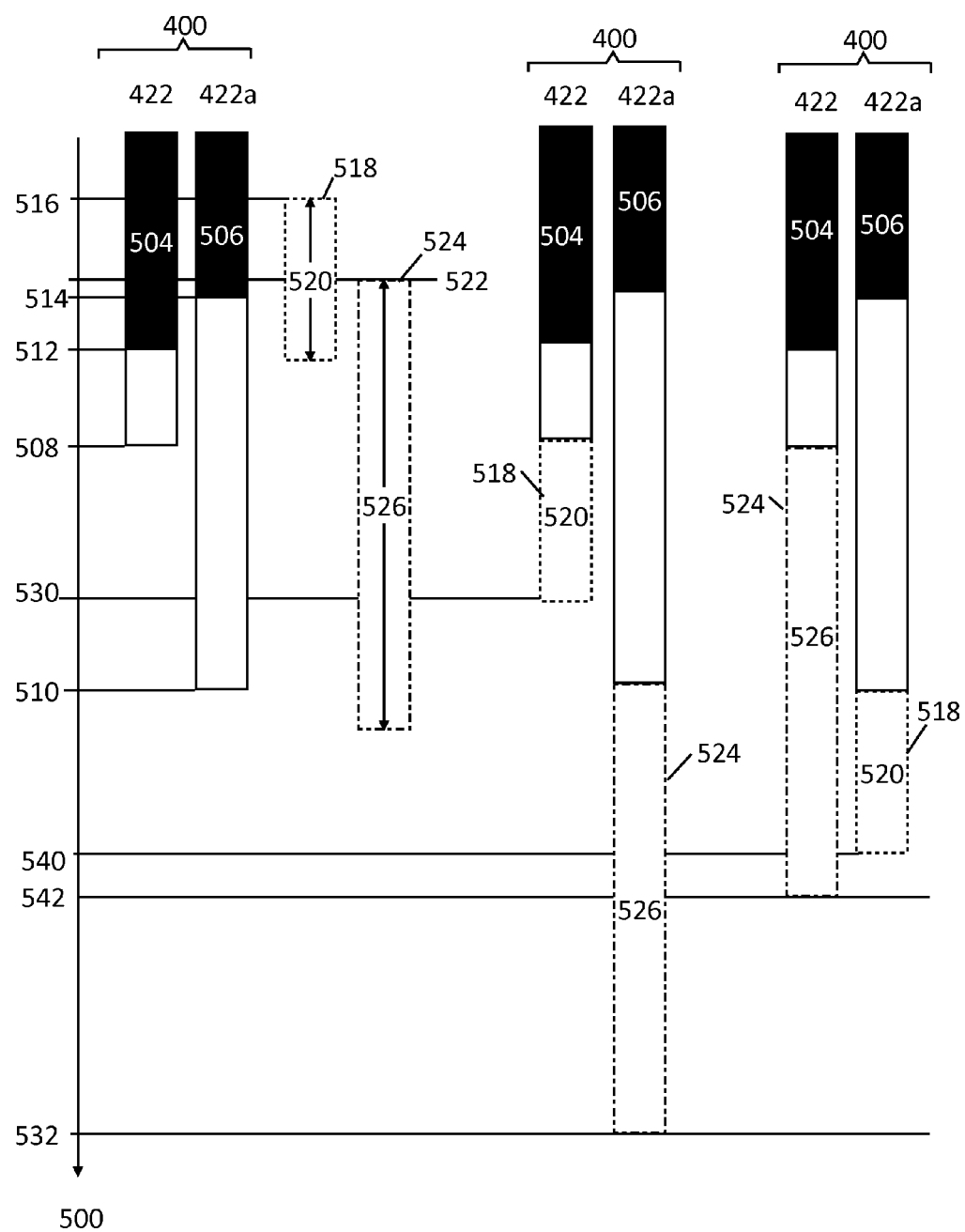
FIG. 9 illustrates, schematically, a queuing sequence for a download booth in accordance with the invention.

The connection sequencing of wireless devices is illustrated schematically in FIG. 9 of the drawings, which shows the timing of connections and downloads (with increasing time being represented by the vertical down axis 500.

A download booth 400 comprises two access points 422, 422a. At time 502, both access points 422, 422a are partway through serving concurrent downloads 504, 506 to separate wireless devices (not shown). Each of the concurrent downloads 504, 506 is estimated to take up to times 508 and 510, respectively, to complete, and each download 504, 506 has to time 512, 514, respectively, as indicated by the dark shading being akin to a download "progress bar".

At time 516, a first additional wireless device attempts to initiate a download 518 of estimated duration 520. Shortly thereafter, at time 522, a further additional wireless device attempts to initiate a download 524 of estimated duration 526. Because both of the access points 422, 422a are fully allocated, the subsequent download requests 518, 524 need to be queued.

On a first-come-first-served basis, as it is known to do in the hitherto, and as shown in the middle of FIG. 9, the first-received additional download 518 is initiated at time 508, i.e. when the first available access point 422 becomes available, and the second additional download 524 is served by the next available access point 422a when it becomes available at time 510. This results in the first additional download 518 completing at time 530 and the second additional download 524 completing at time 532. In other words, all downloads are completed at time 532, in this example.

The invention, by contrast, queues the additional download requests 518, 524 differently, as shown in the right hand side of FIG. 9. The invention estimates the download time 520, 526 for each download request 518, 524 before allocating the requests to any particular access point 422, 422a. In particular, the invention calculates the end time for completing all of the pending 504, 506 and additional 518, 524 downloads and allocates the requests to different access points 422, 422a accordingly. In this simplified example, the invention performs a number of calculations, such as:

$$t(508)+t(518)=t(530) \qquad -(1)$$

$$t(508)+t(524)=t(542) \qquad -(2)$$

$$t(510)+t(518)=t(540) \qquad -(3)$$

$$t(510)+t(534)=t(532) \qquad -(4)$$

The resultant times 530, 542, 540, 532 are then tabulated, and it is determined that the shortest time in which all downloads can be completed is t(542), which requires the ordering of the downloads to be changed as follows: 504, 506, 524, 518 (as opposed to the first-come-first-served ordering: 504, 506, 518, 524). Thus, by reordering the download requests and by intelligently allocating the downloads to various access points 422—not necessarily to the first-available access point—the overall duty cycle of the local server 414 can be reduced. The invention thus represents a significant departure from established practice in terms of download queuing, as well as greatly increasing the speed and capacity of download booths.

The invention is not restricted to the details of the foregoing embodiments, which are intended to be illustrative, rather than restrictive on the interpretation and understanding of the invention. For example, any shapes, dimensions, numbers, times, parameters, etc., whether explicit or implied, may be exemplary of the invention only.

What is claimed is:

1. A download booth comprising a local file server operatively connected to a removable disk drive containing, in use, multimedia content, the local file server further comprising (1) a network interface operatively connected to a plurality of wireless access points and (2) a wireless connection manager, wherein the wireless connection manager is configured to authenticate incoming connection requests from a plurality of wireless devices and upon authentication, to temporarily connect each authenticated wireless device to its own access point connection for the duration of a connection session, wherein the wireless connection manager is configured to queue connection requests when the number of concurrent connection requests exceeds the number of available access points, and the wireless connection manager is further configured to queue further connection requests dynamically whereby the wireless connection manager populates a connection table with the further connection requests, the connection requests contain data indicating a size of a file to be downloaded from the download booth, the wireless connection manager is further configured to prioritize the connection requests according to an estimated aggregated end time for completing download requests, and the wireless connection manager is further configured to calculate an end time for completing all pending downloads, calculate another end time for completing all of the further downloads, tabulate an aggregate end time for completing all of the pending and further downloads for downloads allocated to different access points in different orders, determine a shortest aggregate time in which all of the pending and further downloads can be completed, and order and allocate the further download requests to different access points so as to minimize an aggregate download time.

2. The download booth of claim 1, wherein each access point comprises a 802.11ac standard Wi-Fi access point.

3. The download booth of claim 1, further comprising an external bank of wireless access points operatively connected to the network interface.

4. The download booth of claim 1, wherein the file server is connected, via the internet, to a remote file server, and the file server is adapted to download additional content from a remote source, and store the additional content on the removable disk drive, or on one of a logically or physically separate hard disk of the file server.

5. The download booth of claim 1, wherein the file server further comprises:

a file system for organizing and searching the multimedia content, and a web-based portal via which users at least one of browse and search the file system for content, and wherein the web-based portal is accessible via a non-password-protected wireless connection to the download booth.

6. The download booth of claim 1, wherein the local file server comprises a network interface operatively connected to the plurality of wireless access points.

7. The download booth of claim 1, wherein the wireless connection manager is further configured to authenticate incoming connection requests from wireless devices.

8. The download booth of claim 7, wherein the wireless connection manager is further configured to authenticate incoming requests using an application executed in the wireless device.

9. The download booth of claim 8, wherein the application executed in the wireless device comprises an authentication interface whereby a user of the wireless device authorizes a download by entering authentication credentials for a subscription service.

10. The download booth of claim 8, wherein the application executed in the wireless device comprises an authentication interface whereby a user of the wireless device authorizes a download by entering payment credentials.

11. The download booth of claim 8, further comprising an open access wireless connection via which, the application is downloadable to the wireless device.

12. The download booth of claim 11, wherein the wireless connection manager comprises a web server via which a web browser form is made accessible to users of wireless devices, and wherein via the web browser form, users input authentication details to gain access to the multimedia content on the file server.

13. The download booth of claim 1, wherein the wireless connection manager is further configured to close connections to individual wireless devices at an end of an estimated download time for a particular multimedia file.

14. The download booth of claim 1, wherein the wireless connection manager is further configured to close connections to individual wireless devices upon detection of completion of a download from the download booth to the wireless device.

15. The download booth of claim 1, wherein the local file server comprises a connection table containing a data relating to at least one of concurrent and historic connection sessions.

16. The download booth of claim 1, further comprising a display comprising a display screen having a first side and a second side, a first projector arranged to project a first image onto the first side of the display screen, and a second projector arranged to project a second image onto the second side of the display screen the display screen being manufactured from a transparent or translucent material and wherein the NFC tags are sandwiched between two layers of the display screen forming the first and second sides.

17. The download booth of claim 16, wherein each NFC tag is loaded with data associated with specific multimedia content hosted on the local file server.

* * * * *